United States Patent [19]

Eisler

[11] 4,150,551

[45] Apr. 24, 1979

[54] COOLING APPARATUS

[76] Inventor: Paul Eisler, 57 Exeter Rd., London NW2, England

[21] Appl. No.: 862,549

[22] Filed: Dec. 20, 1977

Related U.S. Application Data

[63] Continuation-in-part of Ser. No. 541,258, Jan. 15, 1975, abandoned.

[51] Int. Cl.² ............................................. F28D 21/14
[52] U.S. Cl. ................................. 62/281; 62/DIG. 1; 62/244; 62/259; 165/49; 165/174
[58] Field of Search ................... 165/49, 33, 110, 174; 62/272, 281, DIG. 1

[56] References Cited

U.S. PATENT DOCUMENTS

| | | | |
|---|---|---|---|
| 2,874,555 | 2/1959 | Disinger et al. | 165/174 X |
| 2,966,780 | 1/1961 | Mills | 165/49 X |
| 3,143,637 | 8/1964 | Rifenbergh | 165/49 X |
| 3,170,512 | 2/1965 | Smith | 165/110 |
| 3,394,756 | 7/1968 | Warner et al. | 165/110 |
| 3,782,132 | 6/1972 | Lohoff | 165/49 X |
| 3,905,203 | 9/1975 | Jacob | 62/272 |

FOREIGN PATENT DOCUMENTS 2255684  6/1973  Fed. Rep. of Germany ...... 62/DIG. 1

Primary Examiner—Albert W. Davis, Jr.
Attorney, Agent, or Firm—Laurence R. Brown

[57] ABSTRACT

The invention provides a heat absorptive panel which has coolant circulation passages within it and is provided with means for reducing or preventing surface condensation of moisture from a humid atmosphere. The condensation is reduced by providing a panel covering of bleached cotton fabric which retains a uniform wet film of initial condensate which inhibits further condensation.

16 Claims, 23 Drawing Figures

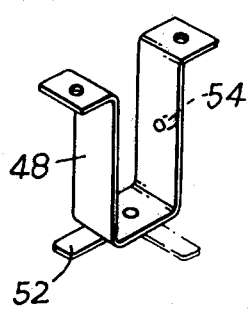
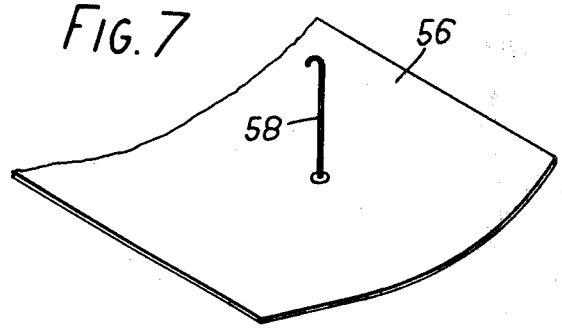
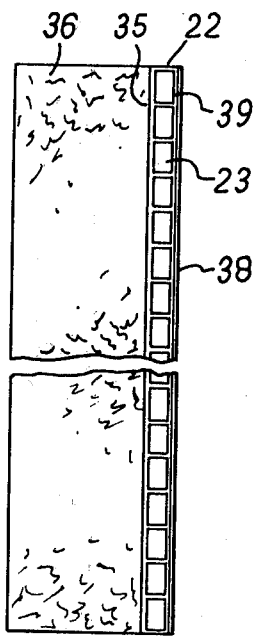
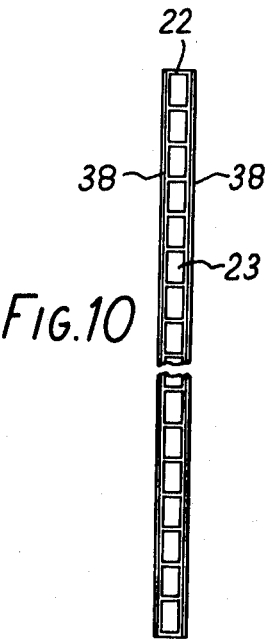
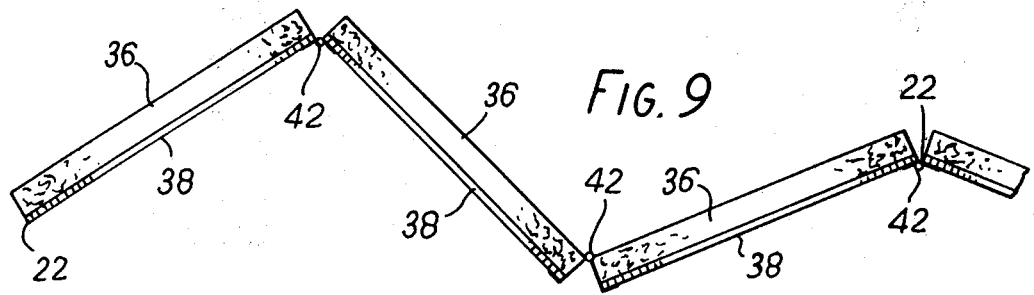

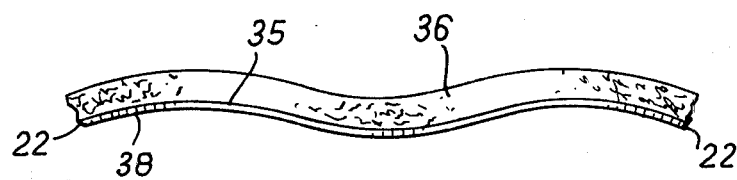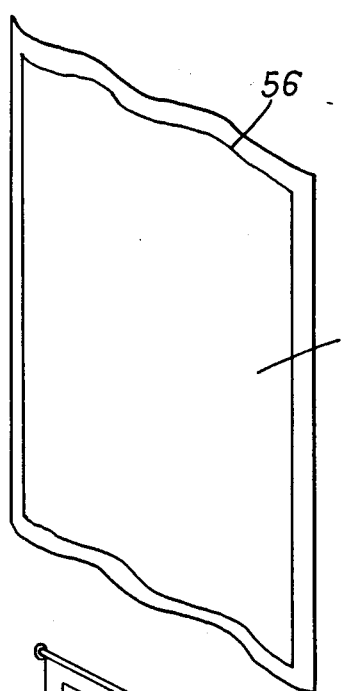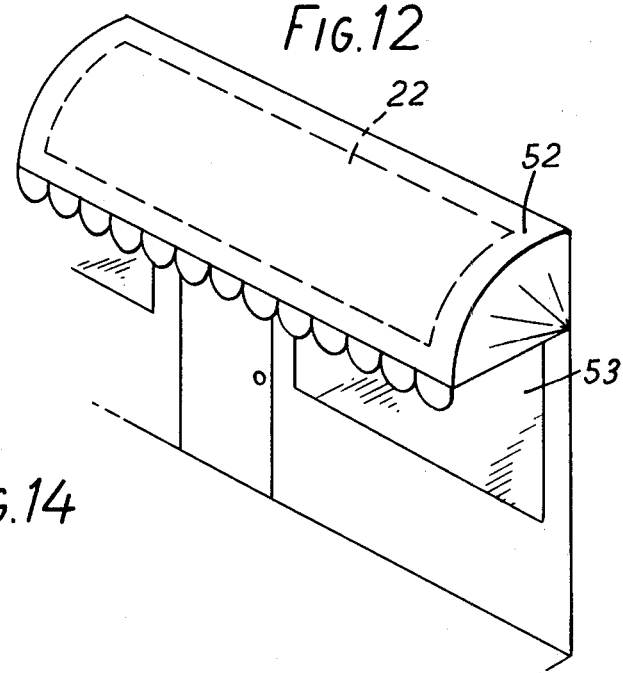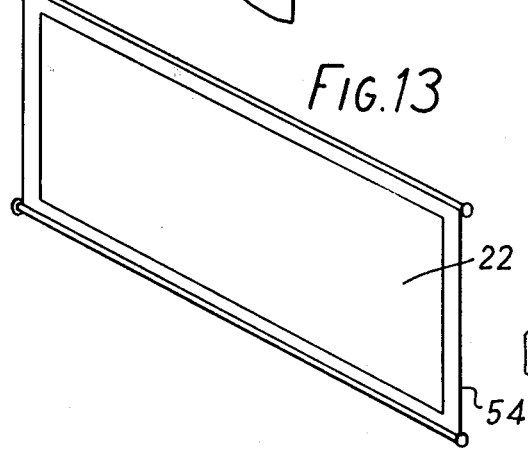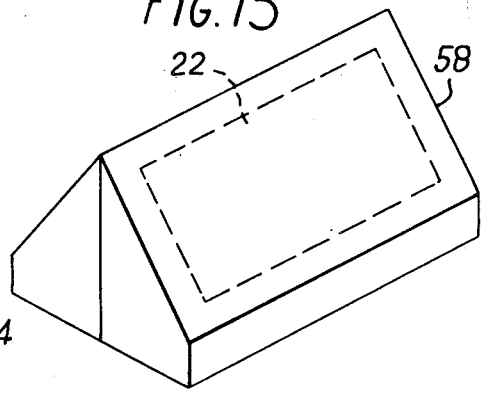

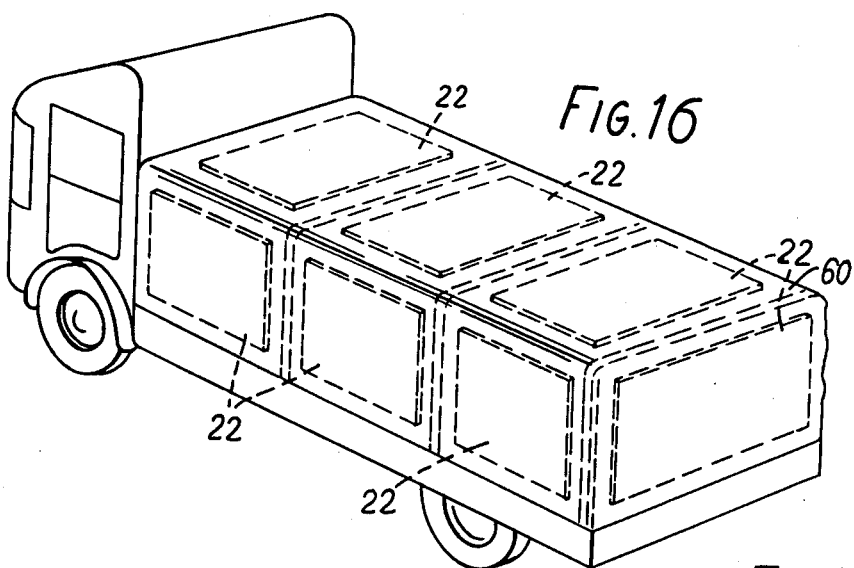
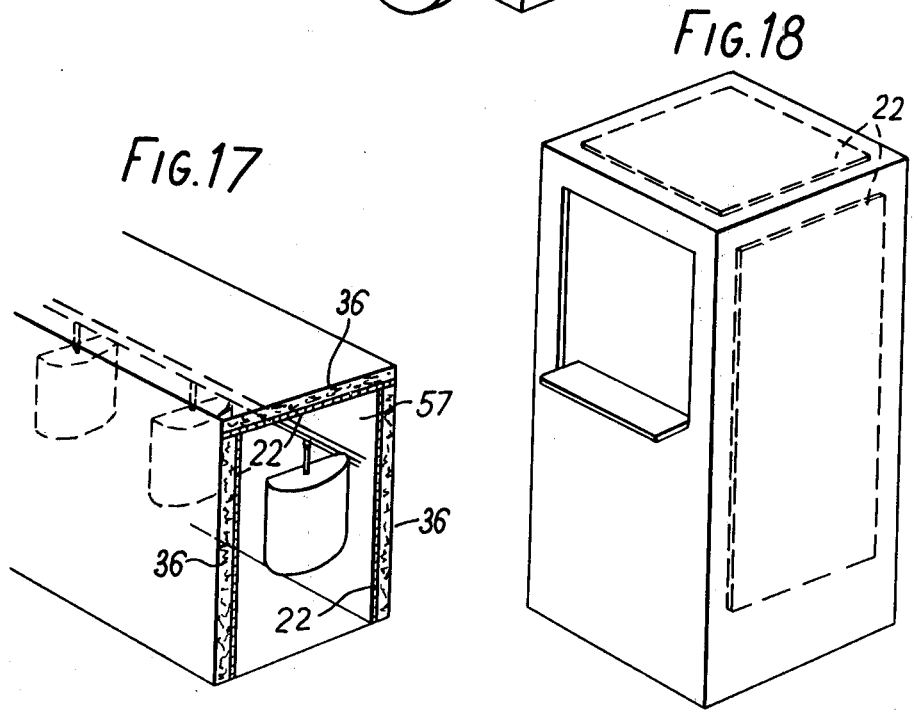

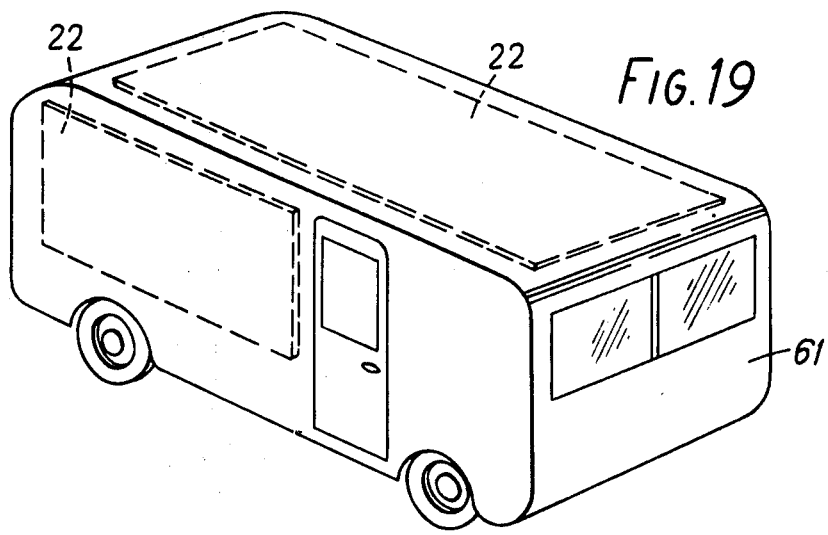
FIG. 19
FIG. 20
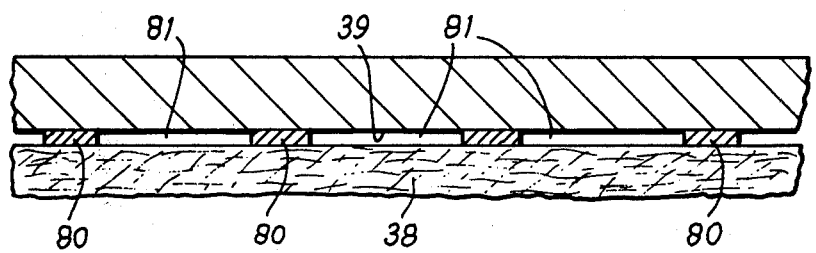
FIG. 21
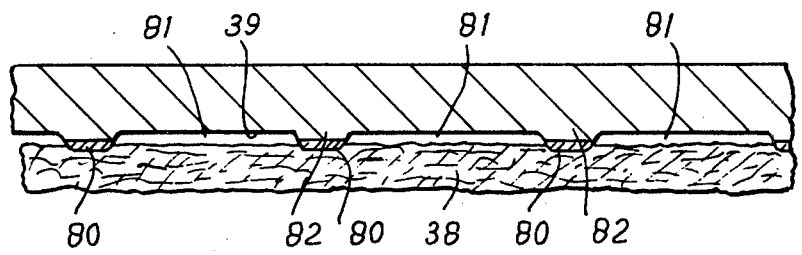

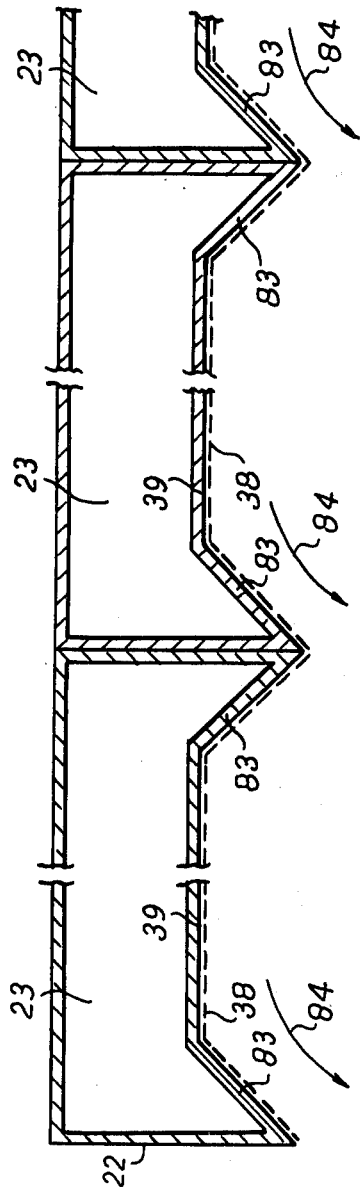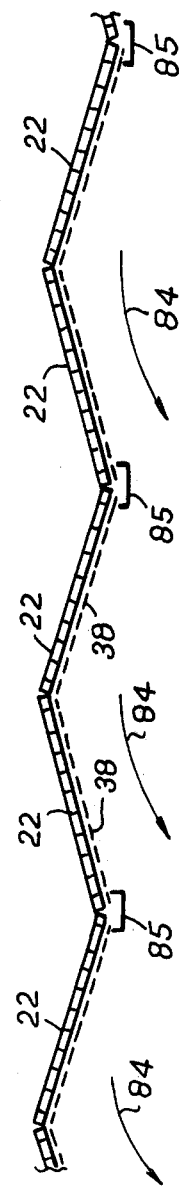

COOLING APPARATUS

This is a continuation-in-part of copending application U.S. Ser. No. 541,258 filed Jan. 15, 1975 now abandoned.

The present invention relates to cooling apparatus, such as may be used to absorb heat from neighbouring individuals and objects.

DESCRIPTION OF THE PRIOR ART

It is known that, without appreciably reducing the temperature of the environment and the atmosphere, it is possible to cool objects and persons by providing a suitable sink for the radiant heat energy they emit. Such a radiant heat sink must be in direct and radiant heat-transfer relationship with the objects and persons to be cooled and of sufficient area to occupy a fairly large spatial angle so as to absorb heat by radiation. Furthermore such a radiant heat sink must be at a relatively low temperature and, consequently, condensation of moisture from a hot, humid atmosphere on to the surface of the heat sink can be a problem. The removal of latent heat of condensation of the moisture also consumes energy.

SUMMARY OF THE INVENTION

According to the present invention there is provided radiant heat absorption apparatus, comprising a relatively large, substantially impervious sheet of low thermal resistance and low thermal capacity, and having inner and outer surfaces; at least one channel in heat exchanging relationship with said inner surface and through which fluid can be passed; and a hydrophilic covering on said outer surface, said covering exhibiting a substantial degree of capillarity in directions generally parallel to said outer surface; whereby said apparatus provides a heat absorption surface capable of operating at a temperature below the dew point with a reduced rate of condensation on it.

In operation, the hydrophilic layer becomes damp and restricts condensation upon the surface of the apparatus. The atmosphere is not appreciably dehumified since little moisture is condensed therefrom. There is no danger of the layer icing up as the operating temperature of the outer surface, while capable of operating below the dew point, is held above the freezing point (of water or—in some chemical plant—of vaporizing substance).

BRIEF DESCRIPTION OF THE DRAWINGS

Various embodiments of the invention will now be described in more detail, by way of example, with reference to the accompanying drawings, in which . . .

FIG. 6 is an oblique view of a bracket used for supporting the panels, also shown in FIG. 4;

FIG. 7 is an oblique view of a section of gutter, also shown in FIG. 4;

FIG. 8 is a horizontal section of a vertical radiant heat absorptive panel;

FIG. 9 is a horizontal section of a plurality of similar panels joined by hinges;

FIG. 10 is a horizontal section of a similar panel with two radiant heat absorptive surfaces;

FIG. 11 is a cross section of a flexible heat absorptive panel;

FIGS. 12 to 19 show an awning, a blind, a curtain, a tent, a tarpaulin, a cooling channel, a kiosk, and a vehicle respectively, including one or more radiant heat absorptive panels;

FIGS. 20 and 21 show embodiments of the invention wherein the adhesive does not penetrate the water absorption surface covering and wherein water gathering reservoirs are provided between the metallic cooled panel and the water absorbing surface covering; and FIGS. 22 and 23 show blinkered cooling panel surface structure which induces air current patterns for preventing accumulation of dirt and dust on the water absorbing secondary cooling surface covering.

DETAILED DESCRIPTION

Figure 1:
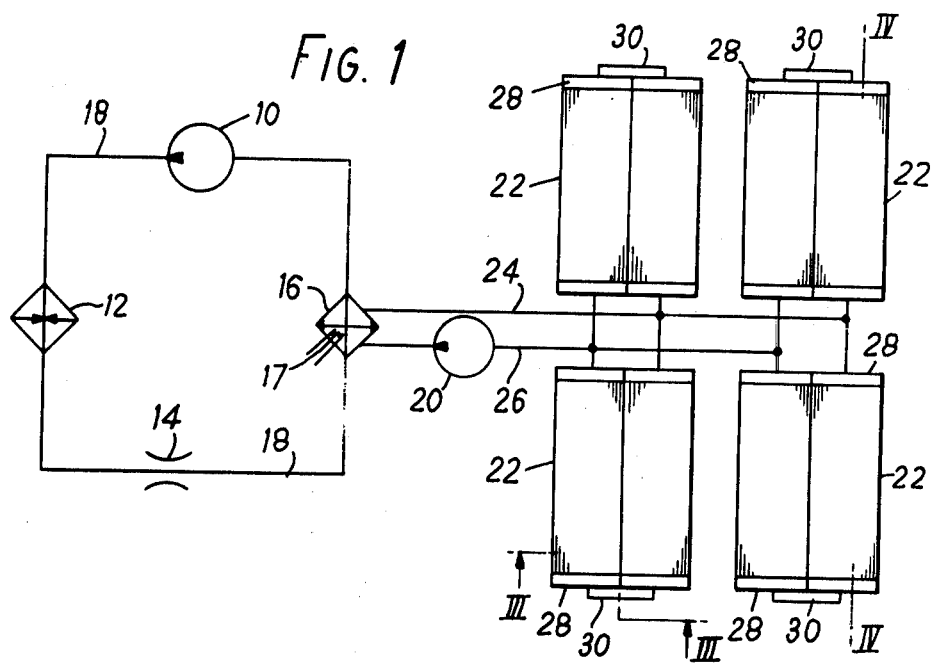
FIG. 1 is a partly schematic plan of apparatus including radiant heat absorptive panels.
Figure 2:
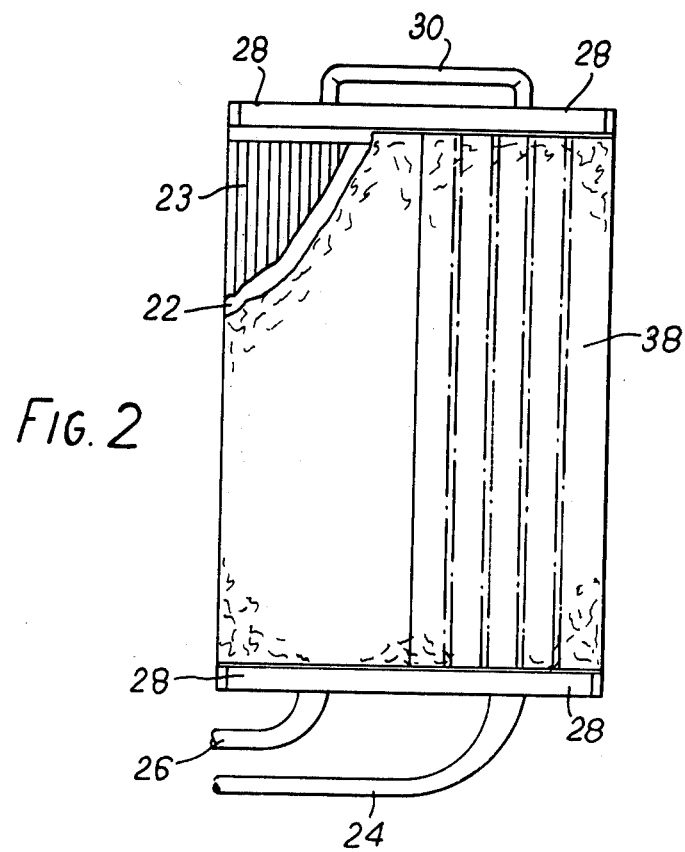
FIG. 2 is an enlarged plan of one panel.
Figure 3:
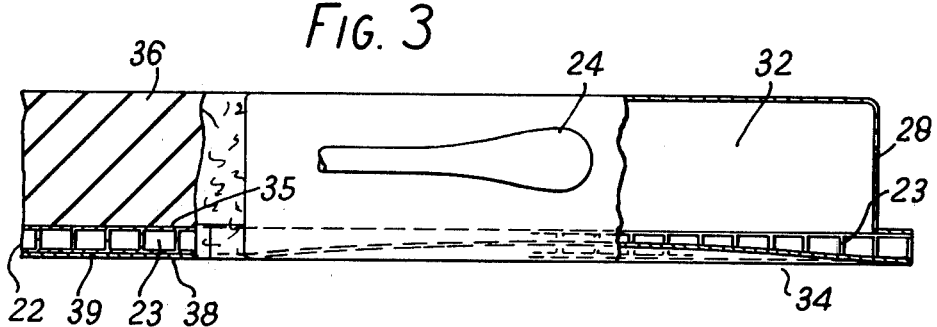
FIG. 3 is a view of the panel shown in FIG. 2, partly in section on the line III—III in FIG. 1, showing parts broken away.
Figure 4:
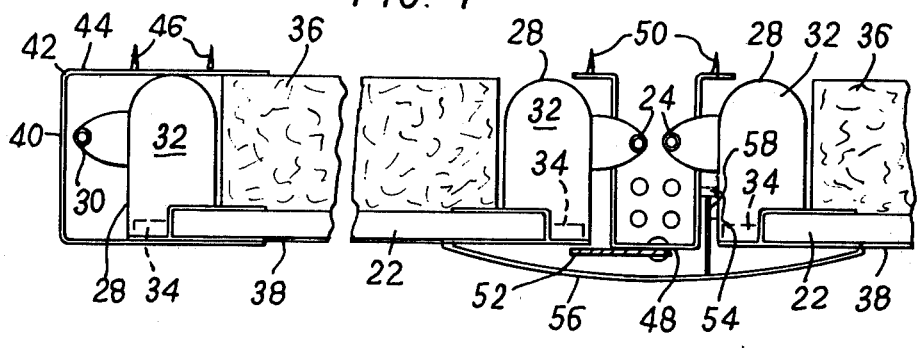
FIG. 4 is an enlarged view of part of the panels shown in FIG. 1 in section on the line IV—IV, designed for fixing to a ceiling or in a horizontal plane.
Figure 5:
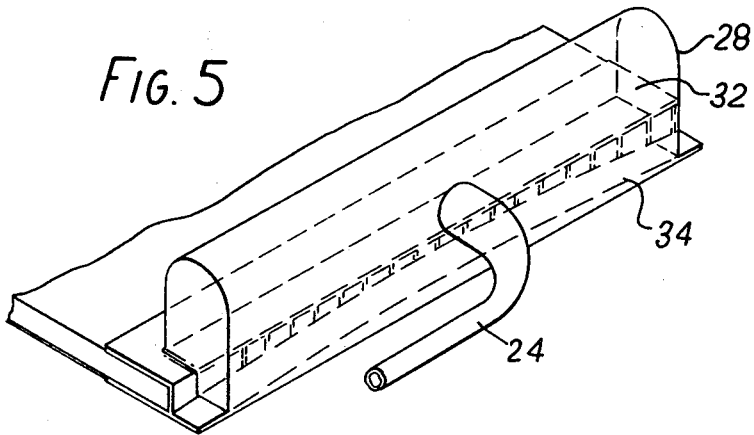
FIG. 5 is an oblique view of a header attached to a heat absorptive panel.

The apparatus shown in FIG. 1 comprises a compressor 10, a heat exchanger 12, a throttle or restriction 14, a heat exchanger 16, fluid lines 18, a pump 20, four radiant heat absorbing devices in the form of corrugated plastics panels 22 each containing a plurality of parallel channels 23, supplied by fluid lines 24 and 26. As shown more clearly in FIG. 2, two headers are fitted to each end of each panel 22, dividing the channels 23 into two groups for outward and return flow. The two headers on the outer end of each panel are connected by fluid lines 30, and the fluid lines 24 and 26 are connected to the headers on the inner end of each panel. As shown in FIGS. 3 and 4, each header 28 comprises a hollow portion 32 and a wedge 34. The wedge id disposed adjacent to the ends of the channels 23, partially occluding them to a degree which increases towards the centre of the group of channels. If the panels 22 are in a room of a building, the compressor 10, heat exchanger 12, throttle 14, heat exchanger 16, fluid lines 18 and pump 20 are preferably placed outside the room, so as to avoid noise in the room.

A layer 36 of thermally insulating material is attached to the upper surface 35 of each panel 22 and a covering 38 of bleached cotton fabric is adhesively secured to the lower surface 39 of each panel. The adhesive layer must be so thin or of such nature that it cannot penetrate the covering 38 nor render its hydrophilic nature inhomogeneous. Excess adhesive is not used so that the surface remains capable of uniform wetting. Low thermal inertia is achieved by the sheet between the channels 23 and the surface 39 being very thin; if it is of good thermally conducting material (aluminum, copper or other metal) a further reduction in inertia is achieved. The outer ends of each panel are attached to brackets 40 which have a horizontally extending hinge 42. The upper part 44 of each bracket is secured by screws 46 to a ceiling (not shown). Between the inner ends of the panels 22 brackets 48, shown in FIGS. 4 and 6, are fixed to the ceiling by screws 50. At the bottom of each bracket 48 there is a turnbuckle 52 which may be used to support the inner ends of the panels 22. On one side of each bracket 48 there is an outwardly projecting horizontal peg 54. A gutter 56, shown in FIGS. 4 and 7, has hooks 58 which support the gutter by engagement over the pegs 54. The brackets 48 together provide support for lengths of fluid line connected to the inner ends of the panels. The gutter covers the brackets, fluid lines and associated parts from sight from below, and provides an attractive appearance.

In use, the compressor 10 warms and delivers pressurized refrigerant to the heat exchanger 12 where the refrigerant warms the environment and becomes cooled. A cooling fan (not shown) may be provided to increase the flow of air over the heat exchanger 12. The cooled refrigerant passes through the throttle 14 where it expands and is abruptly cooled. The refrigerant passes through the heat exchanger 16 and back to the compressor 10. The pump 20 circulates coolant through the heat exchanger 16, where it is cooled, through the fluid line 24 and the panels 22, and back through the line 26. In the present case, the coolant is water although, with modified apparatus providing a greater flow of coolant, air may be used. The coolant flows outwardly through the channels 23 in one half of each panel 22, through the fluid line 30, and back through the channels in the other half of each panel. The wedges 34 within each header 28 are shaped to adjust the flow resistance through the channels 23 so that, in conjunction with the effects of the resistance to flow through the headers, the rate of flow of coolant is the same through each channel. The coolant cools the panels 22 in passing through the channels 23, and is warmed during its passage through the panels by heat they receive.

The cooling panels are positioned in radiant heat exchanging relationship with persons to be cooled. Each panel measured 4 ft.×4½ ft. and, being so large, is conveniently fixed to the ceiling of a room or generally horizontally above persons and objects to be cooled. The panels cool objects in their vicinity by absorption of radiant energy over a substantial spatial angle. Where the atmosphere is humid, there is a tendency for water vapour to condense on a cold surface. This tendency is reduced in the present embodiment by the covering 38 of bleached cotton fabric on the lower surface of each panel. This fabric absorbs the initial condensate and becomes uniformly moist. It is found that further condensation of air-borne moisture on to this fabric surface is very much reduced, and that droplets of water do not form on the panels or fall into the space below them. It is believed that the damp fabric creates a barrier to the approach of atmospheric moisture by virtue of its own vapour pressure. Experiment has shown bleached cotton fabric and blotting paper to be particularly effective in inhibiting condensation and droplet formation, although other surface coverings may be used, such as regenerated cellulose, fibrous mats, gauze and muslin. It is assumed that the hydrophilic nature of the surface covering is responsible for a low contact angle of the initial condensate so that developing droplets grow in directions generally parallel to the surface, and not normal to it. The cellulosic fibrous material then keeps the liquid by its capillary forces in an overall homogeneous film. Thus the highest efficiency is secured by a surface covering with a structure of hydrophilic capillaries which are essentially parallel to the surface. It will be appreciated that the cooling apparatus does not extract the latent heat of vaporization from the humid atmosphere, and it is therefore particularly economical of energy. The atmosphere in the neighbourhood of the panels is not dehumified and for some applications, such as that shown in FIG. 17, this may be advantageous.

The layer 36 of thermally insulating material restricts the absorption of heat by the panels from above, which is desirable to minimize the cooling effort required in the system and to keep its thermal capacity at a low value. It is also important, for the sake of efficiency and performance, to keep separate the panels 22 and the heat exchanger 12, so as to prevent heat leaking back to the persons the system is used to cool. Since the air temperature and humidity in the neighbourhood of the panels are not affected by the cooling apparatus, it may be used either indoors or in the open air.

Further economical cooling of persons may be achieved, in conjunction with apparatus as described, by the use of electric fans (not shown) to circulate the atmosphere and to provide a comforting breeze.

Since the thermal inertia of the apparatus is low, it may rapidly be brought into operation. This can lead to further economies of power consumed by the apparatus, since it need be operated only at places and during periods in which persons are present.

The refrigerant circuit including the compressor 10, throttle 14, lines 18 and heat exchangers 12 and 16 operates on the principle of a domestic refrigerator which, though usually a compression type as shown, may alternatively be of the absorption type.

The cooling apparatus may, if desired, be used to provide heating. All that is necessary in this case is to reverse the connections to the compressor 10 so that the refrigerant circuit pumps heat from the environment through the heat exchanger 12 to the heat exchanger 16 and thence out into the panels. Such reversal may be accomplished by use of a reversing valve. If insufficient heat output is provided by the panels in this reverse mode of operation, an electric heating element 17 may be provided in the heat exchanger 16.

A suitable material for rigid panels 22 is Correx Plastics Corrugated Board, manufactured in the United Kingdom, and available from Corruplast Limited, 1 New Oxford Street, London, WC1A 1PE. This material is produced for packaging and display purposes, and comprises a one-piece extrusion of two layers of ethylene/propylene copolymer, separated by ribbing. The pump 20 may comprise a conventional water circulator, such as used in central heating systems, available from Anglo Nordic Thermal Sales Limited, 74 London Rd., Kingston-upon-Thames, KT2 5BR.

In similar apparatus, shown in FIGS. 8 to 19, the radiant heat absorbing surface and channels can take different forms. In some circumstances vertical radiant heat absorptive panels may be convenient, for example as partitions or screens in open-plan areas, or for temporary surrounding of an object or person. The latter provides a very favourable configuration of panels.

By provision of gaps between small groups of parallel channels within a single panel and/or gaps between modules or units of panels, acoustic absorption effects can be achieved in some ways similar to those achieved with well-known types of acoustic ceilings. Concealed or direct lighting effects are also obtainable by putting strip lights or other light sources behind the panel.

Cooling panels may be used in a heated environment such as, for example, a television, film or photographic studio. The cooling panels may be situated close to actors and others who would otherwise be excessively warmed by radiation from the photographic lighting and, being silent in operation, are particularly useful in this situation.

FIG. 8 shows a horizontal section of a vertically arranged radiant heat absorptive panel 22. As in the case of the ceiling-mounted panel described above, coolant channels 23 are provided within the panel and are coupled in a coolant circuit by means of headers. The panel has two surfaces 35, 39, one of which (35) carries a layer of thermally insulating material 36 and the other (39) carries a covering of bleached cotton fabric 38. The surface of the panel covered by the cotton fabric acts as a radiant heat absorber, whilst the other surface is thermally insulated from the environment.

Vertically arranged panels 22 may be coupled by means of vertical hinges 42 so as to form a foldable screen, as shown in section in FIG. 9.

FIG. 10 is a horizontal section of a panel similar to that shown in FIG. 8, but with both surfaces covered by bleached cotton fabric 38. In this case both surfaces act as radiant heat absorbers. Such a panel is suitable for cooling persons in the vicinity of both surfaces.

The radiant heat absorber may be made of flexible materials so as to be suitable for the construction of curtains, tents, blinds, awnings, baldachins and sunshades for use over beds, sofas, desks, tables, etc. In some cases it is desirable that the radiant heat absorber should absorb heat on one surface only, whereas in other cases radiant heat is preferably absorbed by both surfaces.

A section of a flexible heat absorber is shown in FIG. 11. The panel 22 is flexible and carries on one surface 35 a flexible thermally insulating layer 36. On its other surface 39 is carried a layer 38 of bleached cotton fabric. As in previous embodiments, coolant is circulated through the channels 23 and supplied by flexible lines 24, 26 (not shown). As shown in FIGS. 12, 13, 14, 15 and 16 respectively, such a flexible heat absorptive panel 22 may comprise part of an awning 52 which may, for instance, shade a shop window 53 and provide cooling for onlookers in hot weather, and shelter and warmth when it is snowing and cold. A flexible cooling panel may form part of a roller blind 54 (FIG. 13), a curtain 56 (FIG. 14), a tent 58 (FIG. 15) or a tarpaulin 60 (FIG. 16) used to keep cool persons and objects the panel faces or surrounds. In the case of a structure forming a chilling chamber, a container or cooling channel 57 (FIG. 17) or in a kiosk (FIG. 18) heat-absorbing panels 22 may form part of the walls of the structure itself. A substance cooled in a hermetically sealed cooling channel 57 may be food with a critical liquid content. The condensation reducing feature of the heat absorptive panel tends to keep the absolute humidity in the channel constant while the food cools down. Heat from the outside environment is largely blocked by the thermally insulating layer, and the surface covered with fabric 38 acts as an absorber of radiant heat from objects within. As shown in FIG. 19, radiant heat absorptive panels 22 may be used in the roofs or walls of a vehicle 61 to keep the occupants or contents cool. It is the purpose of the apparatus to keep cool a person or an object, not a room or space. The apparatus is not necessarily used in closed spaces and the use of radiant cooling does not exclude its combination with conventional means of cooling, such as shade, darkening and air movement.

Referring now to FIG. 20, this shows on a much larger scale than FIG. 3 a fragment in cross-section of a part of another embodiment of the invention. All that is shown in FIG. 20 is the surface 39 of the cooled sheet to which the covering 38 of bleached cotton is attached, but it will be understood that the necessary pumps and cooling channels are also provided. In FIG. 20 the covering 38 instead of being attached to the surface 39 by a continuous layer of adhesive it is attached by discrete areas 80 of adhesive with little or no penetration into the covering 38. By this mode of attachment thin voids 81 are created between the covering 38 and the surface 39. In operation these voids fill with water from the covering 38 on which it is condensed from the atmosphere. The water in the voids held by capillarity forms an excellent conductor of heat from the cooled surface 39 to the wetted covering 38. The conduction of heat through the water in the voids is better than through an adhesive layer.

In a modification of FIG. 20 shown in FIG. 21 the surface 39 is arranged to have spots or ridges 82 slightly proud therefrom to which the covering 38 is attached by the adhesive areas shown at 80. The voids 81 so formed fill with water as in FIG. 20.

Referring now to FIG. 22 this shows in cross-section a fragment of a further embodiment of the invention in which the cooling panels are partially indented or blinkered to form extending ridges. When embodiments of the invention are used in locations where a draught of air passes along the panels from open doors or windows, dust can be carried by the air and cling to the coverings 38. After prolonged use under these conditions a layer of dust on the coverings 38 could lead to the formation of droplets of water.

Blinkers at the edges of the panels 22 can serve to deflect the draught and hence extend the period of use before droplets begin to form and cleaning is required.

Such draught-deflecting blinkers can be separate from the panels but preferably they form parts of the panels. As shown in FIG. 22 the margins 83 of ceiling panels 22 are cranked downwardly at about 45° to form blinkers. A draught of air as indicated by arrows 84 is deflected by the blinkers away from the main surface of the panels.

As an alternative or addition to the arrangement of FIG. 22 an arrangement of panels as shown in FIG. 23 may be employed. In this arrangement alternate panels blinker the remainder by mounting the panels in a zig-zag array. In addition if after prolonged use, the accumulation of grime and dust should lead to the formation of droplets of water in the coverings 38, this water will flow to the lower edges of the panels where it can be collected in gutters 85 and carried away. The panels can therefore continue to be used in this condition of reduced efficiency for a short time pending cleaning without troublesome drips occurring.

It is clear therefore that this invention by interposing a wetted water absorptive thin sheet, preferably of hydrophillic cellulosic fibrous material, providing capillarity flow parallel to a cooled surface impervious to air and water and between it and an area to be cooled, dripping is prevented from cooling ducts and the like in a novel manner not heretofore known. Thus, a secondary heat-absorption, wetted-by-condensation, surface covering is disposed adjacent to, masking and at least partly in adhering engagement with a cooled panel to increase cooling efficiency by prevention of energy loss in excessive condensation of water. Cooling is by radiation absorption from the area to be cooled, and in addition undesirable dripping of droplets from the cooling panels is prevented.

Accordingly, those novel features believed descriptive of the spirit and nature of the invention are defined with particularity in the appended claims.

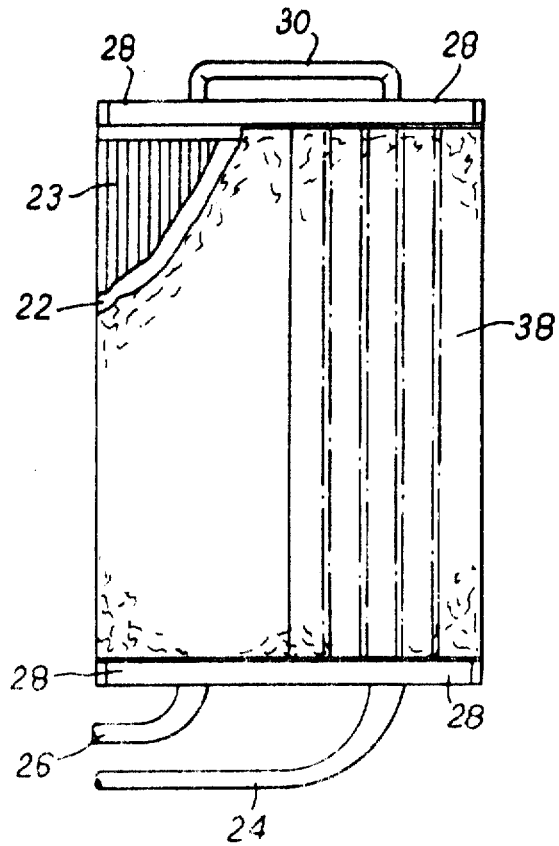

What is claimed is:

1. Cooling panel structure for presenting a drip-free heat absorption surface toward an area to be cooled, comprising in combination, a composite panel of two substantially parallel surfaces, the first being a primary heat absorption surface of a sheet structure impervious to air and water having one face area to be directed as a cooling surface, and the second being a secondary heat absorption surface covering for interposition between said cooling surface and the area to be cooled being at least partly in adhering engagement with said cooling sheet at selected positions on said face area and consisting of a hydrophilic cellulosic fibrous material providing capillarity flow parallel to the surface of the cooling sheet, said secondary surface disposed adjacent to and masking substantially the entire surface of said face area thereby to accumulate and absorb water condensation so that the fibrous material prevents droplets from forming and dripping away from said face area formed by said cooling sheet surface with the fibrous material interposed between it and the area to be cooled.

2. Structure as defined in claim 1 wherein the panel constitutes one outer surface of at least one cooling duct carrying a fluid at lower temperature than ambient temperature in said area to be cooled.

3. Structure as defined in claim 1 wherein said adhering engagement consists of discrete areas of adhesive holding the covering adjacent to the said cooling sheet.

4. Structure as defined in claim 1 wherein the adhering engagement consists of an adhesive holding the covering adjacent to said cooling sheet providing little or no penetration of adhesive into the fibrous material of the absorption surface covering.

5. Structure as defined in claim 1 wherein the surface covering is disposed adjacent the cooling sheet with a plurality if thin voids therebetween establishing small reservoirs in which water may condense and be held to conduct heat between the cooled surface and the thereby wetted surface covering.

6. Structure as defined in claim 5 wherein the voids are formed between ridges extending slightly from the cooled sheet surface.

7. Structure as defined in claim 1 wherein the heat absorption surface is blinkered with spaced ridges thereon to deflect air passing by the cooling surface.

8. A plurality of cooling panel structures according to claim 1 arranged in a zig-zag array and in combination with gutters disposed along the lowermost, juxtaposed edges of the panel structures in the array.

9. Cooling panels presenting a drip-free surface towards an area to be cooled comprising a cooling surface covered by an adjacent water absorptive hydrophilic thin sheet that retains an overall homogeneous film of liquid interposed between the cooling surface and the area to be cooled, thereby to exhibit at a temperature below the dew point a rate of condensation on the sheet below that required to further accumulate liquid or to form droplets.

10. Radiant heat absorption apparatus, comprising:
a relatively large substantially impervious sheet of low thermal resistance and low thermal capacity, and having inner and outer surfaces;
at least one channel in heat exchanging relationship with said inner surface and through which fluid can be passed; and
a hydrophilic covering on said outer surface, said covering exhibiting a substantial degree of capillarity in directions generally parallel to said outer surface, said hydrophilic covering comprising a cellulosic fibrous material, whereby said apparatus provides a heat absorption surface capable of operating at a temperatue below the dew point without accumulation of condensation.

11. Radiant heat absorption apparatus, comprising:
a relatively large substantially impervious sheet of low thermal resistance and low thermal capacity, and having inner and outer surfaces;
at least one channel in heat exchanging relationship with said inner surface and through which fluid can be passed;
a hydrophilic covering on said outer surface, said covering exhibiting a substantial degree of capillarity in directions generally parallel to said outer surface; and
headers for said sheet wherein a plurality of said channels extend in parallel between said headers, said headers including means obstructing the ends of said channels in varying degrees substantially to equalize the cooling fluid flows therethrough;
whereby said apparatus provides a heat absorption surface capable of operating at a temperature below the dew point without accumulation of condensation.

12. Radiant heat absorption apparatus, comprising:
a relatively large substantially impervious sheet of low thermal resistance and low thermal capacity, and having inner and outer surfaces;
at least one channel in heat exchanging relationship with said inner surface and through which fluid can be passed; and
a hydrophilic covering on said outer surface, said covering exhibiting a substantial degree of capillarity in directions generally parallel to said outer surface;
whereby said apparatus provides a heat absorption surface capable of operating at a temperature below the dew point without accumulation of condensation; and
further comprising gaps in said heat absorption surface, whereby acoustic absorption can be provided in combination with heat exchange.

13. Radiant heat absorption apparatus, comprising:
a relatively large substantially impervious sheet of low thermal resistance and low thermal capacity, and having inner and outer surfaces;
at least one channel in heat exchanging relationship with said inner surface and through which fluid can be passed; and
a hydrophilic covering on said outer surface, said covering exhibiting a substantial degree of capillarity in directions generally parallel to said outer surface;
whereby said apparatus provides a heat absorption surface capable of operating at a temperature below the dew point without accumulation of condensation; and
further comprising lighting apparatus whereby said heat absorption apparatus is operable to reabsorb and at least partly compensate for radiant heat supplied by said lighting apparatus to an object or subject illuminated thereby.

14. Radiant heat absorption apparatus, comprising:
a relatively large substantially impervious sheet of low thermal resistance and low thermal capacity, and having inner and outer surfaces;
at least one channel in heat exchanging relationship with said inner surface and through which fluid can be passed;
a hydrophilic covering on said outer surface, said covering exhibiting a substantial degree of capillarity in directions generally parallel to said outer surface;
whereby said apparatus provides a heat absorption surface capable of operating at a temperature below the dew point without accumulation of condensation; and
lamps disposed behind said absorptive surface and arranged so that said lamps are concealed from sight.

15. Radiant heat absorption apparatus, comprising:
a heat exchange sheet of low thermal resistance and low thermal capacity with inner and outer surfaces having passageways therethrough;
means passing a fluid through said passageway for cooling said sheet below the ambient surrounding temperature;
and hydrophilic surface structure on said sheet retaining an overall homogeneous film of liquid thereby to exhibit at a temperature below the dew point a rate of condensation on the sheet below that required to further accumulate liquid or to form droplets.

16. Apparatus as defined in claim 15 wherein said surface structure comprises said hydrophilic covering in contact with an impervious surface enclosing said passageways.

* * * * *

UNITED STATES PATENT AND TRADEMARK OFFICE
CERTIFICATE OF CORRECTION

PATENT NO. : 4,150,551

DATED : April 24, 1979

INVENTOR(S) : Paul Eisler

It is certified that error appears in the above-identified patent and that said Letters Patent are hereby corrected as shown below:

The title page should be deleted to insert the attached title page therefor.

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*

United States Patent [19]

Eisler

[11] 4,150,551
[45] Apr. 24, 1979

[54] COOLING APPARATUS

[76] Inventor: Paul Eisler, 57 Exeter Rd., London NW2, England

[21] Appl. No.: 862,549

[22] Filed: Dec. 20, 1977

Related U.S. Application Data

[63] Continuation-in-part of Ser. No. 541,258, Jan. 15, 1975, abandoned.

[51] Int. Cl.² .................................................. F28D 21/14
[52] U.S. Cl. ................................ 62/281; 62/DIG. 1; 62/244; 62/259; 165/49; 165/174
[58] Field of Search .................. 165/49, 33, 110, 174; 62/272, 281, DIG. 1

[56] References Cited

U.S. PATENT DOCUMENTS

| 2,874,555 | 2/1959 | Disinger et al. | 165/174 X |
| 2,966,780 | 1/1961 | Mills | 165/49 X |
| 3,143,637 | 8/1964 | Rifenbergh | 165/49 X |
| 3,170,512 | 2/1965 | Smith | 165/110 |
| 3,394,756 | 7/1968 | Warner et al. | 165/110 |
| 3,782,132 | 6/1972 | Lohoff | 165/49 X |
| 3,905,203 | 9/1975 | Jacob | 62/272 |

FOREIGN PATENT DOCUMENTS 2255684  6/1973  Fed. Rep. of Germany ...... 62/DIG. 1

*Primary Examiner*—Albert W. Davis, Jr.
*Attorney, Agent, or Firm*—Laurence R. Brown

[57] ABSTRACT

The invention provides a heat absorptive panel which has coolant circulation passages within it and is provided with means for reducing or preventing surface condensation of moisture from a humid atmosphere. The condensation is reduced by providing a panel covering of bleached cotton fabric which retains a uniform wet film of initial condensate which inhibits further condensation.

16 Claims, 23 Drawing Figures